Oct. 6, 1942.  F. H. DRIGGS  2,298,254
ELECTRIC IMMERSION HEATER FOR LIQUID ELECTROLYTES
Filed April 20, 1940
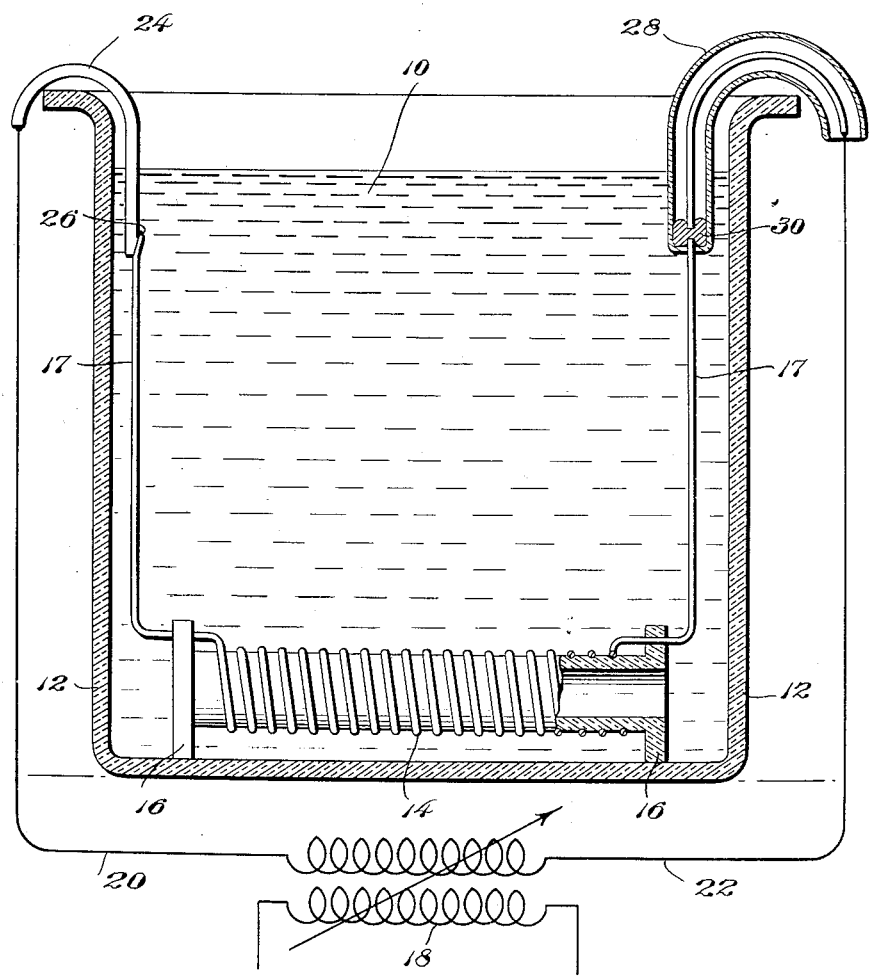
Inventor
FRANK H. DRIGGS
By Keith Misegades
Attorney Patented Oct. 6, 1942

2,298,254

UNITED STATES PATENT OFFICE 2,298,254

ELECTRIC IMMERSION HEATER FOR LIQUID ELECTROLYTES

Frank H. Driggs, Highland Park, Ill., assignor to Fansteel Metallurgical Corporation, North Chicago, Ill., a corporation of New York Application April 20, 1940, Serial No. 330,679

4 Claims. (Cl. 219—41)

This invention relates to electric heaters of the immersion type, of a sort which is especially adapted to be used in a corrosive liquid electrolyte. Immersion heaters of the commonly employed types consist of an electric heating element wound upon an insulating support and covered with a thin layer of electric- and heat-resisting insulation, the whole being surrounded by waterproof metallic jacket. These heaters are open to a number of objections; in particular, one of the principal objections is the temperature gradient which must be overcome between the heating wire and the liquid, since the insulation which is employed to separate the wire from the protective sheet is of necessity also an excellent heat-insulating material. Furthermore, if it is desired to utilize such heating means for corrosive electrolyte instead of water or oil, consideration must be given to the possible corrosive action of the electrolyte upon the casing.

It is an object of my invention to provide a simple electric heating device which is much less expensive to construct than the existing devices.

It is a further object of my invention to provide a more efficient heating device whereby the heat energy is transferred more directly to the liquid which it is desired to heat.

An additional object of my invention is to provide an electric heater which is completely resistant to acid corrosion.

Other objects and features of the invention will be brought out as the description progresses.

Briefly, my invention consists of an electric heating element formed of a coil of metallic wire, the metal being selected from the group of film-forming metals of which tantalum, columbium and aluminum are the best known examples. Such coil is immersed directly in the electrolyte, and a current is passed through the same to heat it. The heat is conducted directly to the liquid electrolyte, but a short circuit through the electrolyte is prevented because of the peculiar characteristic of film-forming metals, which prevents passage of current through the film on the metal in one direction.

The metals characterized above as "film-forming" are distinguished from other metals which may at times possess a film upon their surface in that the film-forming metals in the presence of an electrolyte form a relatively thin film, generally accepted as oxidic in nature, which is anodic to the metal itself, and hence conducts current from an electrolyte to the metal while preventing the passage of current from the metal to the electrolyte. These metals, because of this peculiar property of the film formed upon them, are also known as valve metals.

The invention will now be more extensively described with reference to the accompanying drawing in which the single figure represents a partly sectional, partly schematic illustration of my invention. The device shown represents a body of any suitable electrolyte 10 contained, for example, in a glass beaker 12. A coil 14 of wire of suitable composition is wound upon the vitreous or ceramic support 16. It should be pointed out here that the use of a support is not necessary for the practice of my invention, but its use is advisable in order to protect the coil from injury. The coil may be suitably heated by a passage of either alternating or direct current. In the drawing the supply of current is indicated as coming through a variable transformer 18, drawing current from a conventional 110-volt alternating current power line. The current is conducted from the transformer by means of leads 20 and 22, connected with the ends 17, 17 of the coil 14. In order to prevent the ends 17 of the coil from becoming overheated and oxidizing when in contact with the air, it is advisable to provide suitable means for reducing the temperature of the wire outside of the body of the solution. Two forms of construction for achieving this result are illustrated in the drawing. Lead 20 is attached to one end of the coil by means of a wire 24 of larger diameter than the wire constituting the heating coil welded to the end 17 of the wire at 26. According to this scheme of operation the liquid level should not be permitted to fall below the welded joint. As illustrated in connection with lead 22 the end of the heating coil 17 is sealed into a short curved piece of glass tubing 28 and the lead 22 makes electrical contact with the end of the wire outside of the solution, as for example, through a drop of mercury 30.

Following the teachings of my invention a 25-foot length of tantalum wire approximately .008" in diameter was wound into a coil approximately one-half inch in diameter. Leads of tantalum wire .03" in diameter are welded to the ends thereof to serve as terminals. This assembly was placed in a two-liter beaker nearly filled with a sulphuric acid solution containing 6 per cent acid by volume. An initial current was passed through the wire at 32 volts A. C. until a thin film of tantalum oxide was formed on the surface. Thereafter the voltage was raised gradually until the full operating strength of 110 volts was reached. Under these conditions there is a continuous current consumption of two amperes which maintained the liquid in the beaker at 90° C. No attempt was made to prevent loss of heat through the sides, or evaporation from the surface of the liquid. Operating in this manner, the device was maintained in substantially continuous operation for a period of over six months without adverse effect upon the heating element.

From the foregoing description it will be obvious that I have provided a cheap and economically operable electric immersion heater suitable for use in highly corrosive electrolytes. Tantalum, for example, is substantially completely inert to all of the dilute mineral acids except hydrofluoric acid, and is also substantially inert to all of the more highly concentrated acids except concentrated sulphuric and concentrated phosphoric acids. Others of the film-forming metals are not so completely resistant to acid corrosion, but each of them has a comparatively wide field of application.

It is not necessary to employ such a heater with electrolytes alone, as it will be apparent that they may also be employed with substantially electrolyte-free water. However, it is pointed out that it is necessary to first form the oxide film upon the wire in an electrolyte before using the same.

Another considerable advantage in the use of my invention is that in the event of a sudden surge of voltage followed by the short-circuiting of the device through the liquid, no adverse effect results, since the oxide film on the wire is self-healing.

It will be obvious from the foregoing description that many modifications of the essential characteristics of my invention can be made, and it is my intention to claim all of such modifications as fall within the scope of the appended claims.

I claim:

1. An electric immersion heater for acidic electrolytes, comprising a coil of wire formed of a metal of the group consisting of tantalum, columbium and alloys made up, except for insignificant impurities, solely of tantalum and columbium.

2. An electric immersion heater for liquid electrolytes, comprising a coil of wire formed of a film-forming metal.

3. An electric heating device for immersion in an electrolyte, comprising a non-conducting core resistant to the action of aqueous electrolytes, a quantity of wire formed of a film-forming metal wound thereon in spaced relation, leads for connecting the ends of said wire to a source of electric power outside the body of electrolyte and means for preventing the ends of said leads outside the body of electrolyte from becoming overheated.

4. A unitary immersion electric heating element comprising a ceramic body, wire formed of a film-forming metal wound thereupon and leads for connecting the ends of wire to a source of electric energy.

FRANK H. DRIGGS.